United States Patent [19]

Fischer et al.

[11] 4,114,329
[45] Sep. 19, 1978

[54] ANCHORING ARRANGEMENT KIT

[75] Inventors: Artur Fischer, Weinhalde 34, 7241 Tumlingen, Fed. Rep. of Germany; Klaus Fischer, Tumlingen, Fed. Rep. of Germany

[73] Assignee: Artur Fischer, Tumlingen-Waldachtal, Fed. Rep. of Germany

[21] Appl. No.: 794,238

[22] Filed: May 5, 1977

Related U.S. Application Data

[63] Continuation-in-part of Ser. No. 725,138, Sep. 17, 1976, Pat. No. 4,050,202, Ser. No. 719,146, Aug. 31, 1976, and Ser. No. 631,153, Nov. 11, 1975, Pat. No. 4,044,512, said Ser. No. 725,138, is a continuation-in-part of Ser. No. 631,153.

[30] Foreign Application Priority Data

| Jun. 7, 1975 | [DE] | Fed. Rep. of Germany | 2525452 |
| Jun. 14, 1975 | [DE] | Fed. Rep. of Germany | 2526744 |
| Jun. 21, 1975 | [DE] | Fed. Rep. of Germany | 2527773 |
| Nov. 14, 1974 | [DE] | Fed. Rep. of Germany | 2453957 |
| May 26, 1975 | [DE] | Fed. Rep. of Germany | 2523198 |
| Jun. 6, 1975 | [DE] | Fed. Rep. of Germany | 2525220 |
| Sep. 19, 1975 | [DE] | Fed. Rep. of Germany | 2541762 |
| Sep. 5, 1975 | [DE] | Fed. Rep. of Germany | 2539521 |
| Oct. 4, 1975 | [DE] | Fed. Rep. of Germany | 2544468 |
| Oct. 23, 1975 | [DE] | Fed. Rep. of Germany | 2547412 |
| Nov. 3, 1975 | [DE] | Fed. Rep. of Germany | 2549057 |

[51] Int. Cl.² .................... E21B 17/10; E04B 1/41
[52] U.S. Cl. .................... 52/173 R; 52/127; 52/704; 52/744; 175/220; 206/230; 206/338
[58] Field of Search .................... 175/220; 173/32; 206/230, 338; 52/127, 173 R, 704, 744

[56] References Cited

U.S. PATENT DOCUMENTS

| 741,364 | 10/1903 | Ott | 175/220 |
| 1,996,121 | 4/1935 | Phillips | 52/173 X |
| 2,201,159 | 5/1940 | Clow | 175/409 X |
| 2,707,897 | 5/1955 | Beeson | 175/293 X |
| 2,902,260 | 9/1959 | Tilden | 175/394 |
| 2,964,115 | 12/1960 | Clatfelter | 175/220 X |
| 3,033,298 | 5/1962 | Johnson | 175/209 |
| 3,160,270 | 12/1964 | Werstein | 206/230 |
| 3,532,316 | 10/1970 | Mathes | 52/744 X |
| 3,722,671 | 3/1973 | Wright et al. | 206/338 |
| 3,841,417 | 10/1974 | Crawford, Jr. | 175/394 X |
| 4,010,807 | 3/1977 | Fischer | 175/408 X |
| 4,028,857 | 6/1977 | Fischer | 52/704 |
| 4,044,512 | 8/1977 | Fischer et al. | 52/127 |
| 4,050,202 | 9/1977 | Fischer et al. | 52/704 |

FOREIGN PATENT DOCUMENTS 1,303,573  8/1962  France ..................... 206/338

*Primary Examiner*—Alfred C. Perham
*Attorney, Agent, or Firm*—Michael J. Striker

[57] ABSTRACT

An anchoring arrangement kit includes a drilling tool adapted to drill a generally cylindrical anchoring hole in a support structure. The kit further includes a support arrangement which supports the drill for rocking or orbiting motion to thereby enlarge the bottom region of the cylindrical hole, the arrangement including an abutment member which is stationary, and a cover member which rotates with the drilling tool during the undercutting operation, these members having complementary concave and convex contact surfaces for the rocking or orbiting motion of the drilling tool. The kit further includes a plurality of anchoring elements each having an anchoring member and a cap member surrounding the trailing end portion of the anchoring member so as to support the anchoring element at an open end of the hole with a clearance between the anchoring member and the surface bounding the hole. The kit further comprises an arrangement for introducing hardenable material into the clearance through an opening in the leading end of the anchoring member, which includes an injection device of the cylinder-and-piston type, and a shielding sleeve to guide the hardenable material from the injection device toward the opening and into the clearance. Finally, the kit includes a stirrer for mixing the hardenable material which stirrer has an entraining portion which has a receiving passage adapted to at least partly accommodate the drill bit of the drilling tool.

26 Claims, 12 Drawing Figures

ANCHORING ARRANGEMENT KIT

CROSS-REFERENCE TO RELATED APPLICATIONS

This is a continuation-in-part application of our copending patent applications Ser. Nos. 631,153, filed Nov. 11, 1975, now U.S. Pat. No. 4,044,512 719,146, filed Aug. 31, 1976, and 725,138, filed Sept. 17, 1976, now U.S. Pat. No. 4,050,202 which, in turn, is a continuation-in-part application of copending patent application Ser. No. 631,153, filed Nov. 11, 1975 now U.S. Pat. No. 4,044,512.

BACKGROUND OF THE INVENTION

The present invention relates to an anchoring arrangement for securing objects to support structures in general, and more particularly to a kit containing the components which are necessary for establishing such an anchoring arrangement with the aid of a drive.

There are already known various anchoring arrangements for securing objects to support structures, such as to walls, ceilings or floors. Whatever the construction of the particular anchoring arrangement may be, they have one thing in common, they are to be accommodated in pre-drilled holes in the support structure and secured there against extraction so that the objects can then be attached to such anchoring arrangements when the latter have been so secured in the anchoring holes of the support structures. Among the various ways of securing the anchoring arrangements in the anchoring holes, there is already known to embed the anchoring arrangement in a body of hardened material which has been previously introduced, in its flowable state, into the clearance existing between the anchoring arrangement and the internal surface which bounds the anchoring hole.

The body of hardened material reliably secures the anchoring arrangement in the anchoring hole even when the latter is of a cylindrical, non-corrugated shape. However, even safer retention of the anchoring arrangement in the anchoring hole by the body of hardened material will be achieved when at least the bottom region of the anchoring hole is enlarged during the drilling operation to provide an undercut region of the anchoring hole. A drilling tool which can be advantageously used for such undercutting is disclosed, for instance, in a co-pending commonly owned patent application Ser. No. 511,256 now U.S. Pat. No. 4,010,807 in which the drilling tool has a drill bit extending beyond the outer periphery of the shank of the drilling tool so that rocking or orbiting motion of the drilling tool in the cylindrical pre-drilled anchoring hole about a fulcrum will result in undercutting of the bottom region of the anchoring hole.

A somewhat different drilling tool capable of performing the same function is disclosed in our copending patent application Ser. No. 719,146 which also discloses different forms of a supporting arrangement for providing a bearing for the above-mentioned rocking or orbiting motion of the drilling tool. Basically, such a support arrangement includes a collar member mounted on the drilling tool for drilling rotation therewith, and an abutment member adapted to be stationarily supported on the exposed surface of the support structure around the pre-drilled cylindrical anchoring hole and retained against rotation with the collar member. These two members have respective concave and convex contact surfaces which slide over one another during the rocking or orbiting motion of the drilling tool.

It is also already known to compose the anchoring arrangement which is to be secured in a cylindrical or an undercut anchoring hole in the support structure of two parts, namely an anchoring member adapted to be received in the anchoring hole with a clearance from the surface which bounds such an anchoring hole, and a cap member which surrounds the trailing end portion of the anchoring member and thus holds and positions the anchoring member in the anchoring hole due to its sealing contact with the above-mentioned internal surface bounding the anchoring hole at the open end of the latter which is adjacent to the exposed surface of the support structure. Such anchoring members and cap members are disclosed, for instance, in our copending patent application Ser. No. 631,153, now U.S. Pat. No. 4,044,512 which also discloses various ways of introducing the hardenable material into the clearance around the leading end portion of the anchoring member either through the cap member or through the leading end portion of the anchoring member, which two members together constitute an anchoring element.

As disclosed in the just-mentioned application, the hardenable material may be introduced into the clearance through an opening in the leading end of the anchoring member, by means of a shielding sleeve which extends from the exterior of the support structure through the internal passage of the anchoring member toward the opening which communicates such internal passage with the clearance. The shielding sleeve prevents soiling of a region of the internal surface which bounds the internal passage of the anchoring member, which is located upstream of the region of contact of the shielding sleeve with such internal surface, so that the shielding sleeve can be removed from the internal passage upon hardening of the material, thereby freeing the internal passage for accommodation of a threaded member serving to attach the object to the anchoring arrangement. The shielding sleeve may have a closure attached thereto which is capable of preventing backflow of the hardenable material out of the clearance and through the shielding sleeve to the exterior of the support structure. As an alternative, the injecting device which supplies the hardenable material may have a nozzle, and a plug constructed as a one-way valve is accommodated in the internal passage of the anchoring member just upstream of the opening and permits flow of the hardenable material from the injecting device through the nozzle and through the plug into the clearance but prevents backflow of such hardenable material in the opposite direction.

As the hardenable material is being introduced into the clearance, it is necessary to provide for venting of the air entrapped in the clearance which is being displaced by the hardenable material, out of the clearance. This can be achieved by providing venting openings at or through the cap member.

The concept of providing small-size venting openings through the cap member is disclosed, for instance, in our copending patent application Ser. No. 725,138 filed Sept. 17, 1976, now U.S. Pat. No. 4,050,202 which also specifies that such openings must be of such sizes as to render possible escape of air but prevent such escape of the hardenable substance. This copending application also discloses the concept of making the cap at least partially translucent so as to be able to observe the degree of filling of the clearance with the hardenable material, such as by providing an annular groove in the cap member into which the hardenable material will be able to penetrate only when a certain pressure develops in the clearance, the bottom wall bounding such annular groove then being translucent or even transparent so as to be able to observe the penetration of the hardenable material into the annular groove.

The cylinder-and-piston injecting device which is being used for introducing the hardenable material into the clearance may be of the refillable type, in which event it is necessary to, from time to time, refill the injecting device with the hardenable material. The hardenable material may be of the type which is being supplied in form of a powder which is to be intimately mixed with water or similar fluid to obtain the flowable hardenable material. Thus, it is already known to provide a stirrer which so mixes the hardenable material in a container, the stirrer being constructed as an attachment to the drive which is also used for rotating the drilling tool, such as a power drill or the like. This greatly facilitates and improves the mixing operation. However, inasmuch as the drilling tool has to be removed from the chuck of the power drill and replaced by the stirrer when it is desired to mix a replenishment supply of the hardenable material, and subsequently to release the stirrer and replace the same by the drilling tool, the use of such a stirrer is very laborious and time-consuming.

While the above-discussed components are already individually known, they may not be readily available to the prospective user, particularly since they may be displayed at different locations when on sale. This results in a very disadvantageous situation in that the prospective user may either never come up with the idea of using such components in connection with one another, or may have to make an attempt to assemble such components prior to the use thereof.

SUMMARY OF THE INVENTION

Accordingly, it is a general object of the present invention to avoid the above-mentioned disadvantages.

More particularly, it is an object of the present invention to provide a kit which contains all the necessary components for establishing an arrangement for anchoring objects to support structures.

It is a specific object of the present invention to provide a kit for establishing an arrangement for securing objects to support structures in which a body of hardened material is used for anchoring the arrangement in an anchoring hole. It is a concomitant object of the present invention to provide a kit which enables the user thereof to reliably provide anchoring holes with undercut bottom regions.

A yet another object of the present invention is to provide a kit to be used with a drive for rotating a drilling tool, which kit includes a stirrer that can be rotated by the drive without releasing the drilling tool from the drive.

Still another object of the present invention is to provide a kit of the type here under consideration which renders it possible to easily observe the degree of filling of a clearance around the anchoring arrangement in the anchoring hole with hardenable material.

In pursuance of these objects and others which will become apparent hereafter, one feature of the present invention resides in a kit for use with a drive in establishing arrangements for securing objects to support structures, which kit, briefly stated, comprises a drilling tool for drilling anchoring holes in support structures, having a free end provided with cutting edges and another end adapted to be engaged by the drive for rotating such tool about an axis; means for supporting said tool at an exposed surface of a respective support structure, including a collar member adapted to be mounted on said tool intermediate said ends thereof for joint rotation therewith, and an abutment member adapted to surround said tool and contact said exposed surface, said members having respective concave and convex contact surfaces which, upon slidingly contacting one another, constitute a bearing for movement of said tool between a plurality of positions in which said axis encloses different angles with said exposed surface to thereby increase transverse dimensions of a respective hole in direction away from an open end thereof that opens onto said exposed surface. The kit of the present invention further includes a plurality of anchoring elements each of which has a leading end portion of transverse dimensions smaller than, and a trailing end portion of transverse dimensions substantially corresponding to, those of said open end so that said trailing end portion supports said element in said open end with a clearance around said leading end portion and closes said open end upon insertion of said element into said hole. The kit further includes means for introducing hardenable material into said clearance to form a hardened body around said leading end portion of said element to anchor the latter in said hole upon hardening of said material, including an internal passage bounded by an internal surface and extending through said element between said end portions of the same, at least one opening communicating said passage with said clearance at said leading end portion of said element, and shielding means for guiding said material through said passage toward said opening and for separating such material from a region of said internal surface which is located upstream of said opening.

Preferably, the drilling tool includes a plate-shaped drill bit at said free end, and said cutting edges are provided on said bit. It is also advantageous when the drilling tool has at least one helical recess between said ends thereof, which helical recess is operative for forwarding particulate material removed from said structure during the operation of said tool towards and out of said open end of said hole. The drill bit advantageously has cutouts at the cutting edges which are located at the elevations of the turns of the helical recess.

The collar member of the supporting means preferably has a plurality of grooves which extend substantially parallel to the above-mentioned axis when the collar member is mounted on said tool. These grooves permit the particulate material to escape passed the collar member.

The support means advantageously also includes means for retaining said abutment member against rotation with said collar member, which retaining means can be constructed either as at least one pin-shaped projection connected to said abutment member, which projection penetrates into said structure upon contact of said abutment member with said exposed surface, or as a layer of friction-enhancing material connected to a surface of said abutment member which faces said exposed surface of said structure.

The abutment member can be constructed in several ways. However, it is currently preferred that the abutment member include a housing having an abutment plate provided with one of said contact surfaces, a flange, and a holding sleeve which connects said flange to said abutment plate at a distance therefrom. When the abutment member is constructed in this manner, said collar member is at least partly accommodated within the confines of said housing. The housing may then have at least one escape opening for particulate material which would otherwise accumulate within such confines.

In a currently preferred embodiment of the invention, the anchoring element includes an anchoring member which has said leading end portion and also a trailing end region, and a cap member which is mounted on said trailing end region of said anchoring member and constitutes the above-mentioned trailing end portion of said element. Preferably, the cap member is at least partly translucent for observing the process of filling of said clearance with said material. In a very advantageous embodiment of the present invention, the cap member has an annular groove at a side thereof which faces toward said leading end portion of said element, which groove has such dimensions that said material penetrates into said groove only after a predetermined pressure has been reached in said clearance. In this embodiment, the annular groove has a bottom wall at the other side of the cap member which constitutes a partly translucent portion of said cap member.

The cap member may have, to advantage, at least one vent opening which communicates said clearance with the exterior of said structure, said vent opening having such dimensions as to permit escape of air displaced by the material from said clearance and to prevent such escape of said material.

Advantageously, the anchoring member has at least one corrugation at said leading end portion thereof, which improves retention of said element in said hardened body. Preferably, more than one corrugation is provided, which corrugations may take the form of an undulated end region of said leading end portion.

According to a further concept of the present invention, said shielding means includes a shielding sleeve which has an end zone which contacts said internal surface of said element intermediate said upstream region and said opening upon introduction of said shielding sleeve into said internal passage. The shielding sleeve has a duct which conveys said material toward said openings, said duct having a mouth through which said material is introduced into said duct. Furthermore, a closure is provided for closing said mouth so as to prevent backflow of said material through said duct subsequent to the introduction of such material into said clearance and prior to hardening thereof. The shielding sleeve is accommodated in said internal passage at least between the commencement of the introduction of said material into said clearance and the hardening of said material in said clearance and in said duct. On the other hand, the shielding sleeve is subsequently removable from said internal passage, together with the material which has hardened in said duct, to free said internal passage for receiving a threaded member therein.

According to a further concept of the present invention, the introducing means further includes an injection device which has a nozzle adapted to communicate with said opening through said internal passage. Preferably, the injection device includes a cylinder bounding a chamber, a piston mounted in said chamber for reciprocation and subdividing said chamber into two compartments, one of which communicates with said nozzle, and a piston rod extending through the other compartment to the exterior of said cylinder and having an actuating portion thereat. Advantageously, the nozzle is adapted to be sealingly received in said mouth of said shielding sleeve during the operation of said injection device.

As an additional component, the kit of the present invention further comprises a container for a replenishable supply of said material, and a stirrer for mixing the supply in the container. Preferably, the stirrer is elongated and has a stirring end portion and an entraining end portion, the latter being hollow and adapted to receive the free end of the tool for entrainment of said stirrer for joint rotation with said tool. To advantage, the entraining end portion has entraining regions adapted to abut the tool in the circumferential direction thereof. In a currently preferred embodiment of the present invention, the tool has a plate-shaped drill bit having the above-mentioned cutting edges, and then the entraining regions bound at least one longitudinally extending slot in the entraining portion which is adapted to partly receive the drill bit. According to a further facet of the present invention, the tool has a drill bit which has at least one substantially radial recess at a free end face thereof, and then the entraining portion bounds a receiving passage dimensioned to receive the drill bit and having a bottom which has at least one projection which constitutes the above-mentioned entraining region and contacts the radial recess of the drill bit upon introduction thereof into the receiving passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
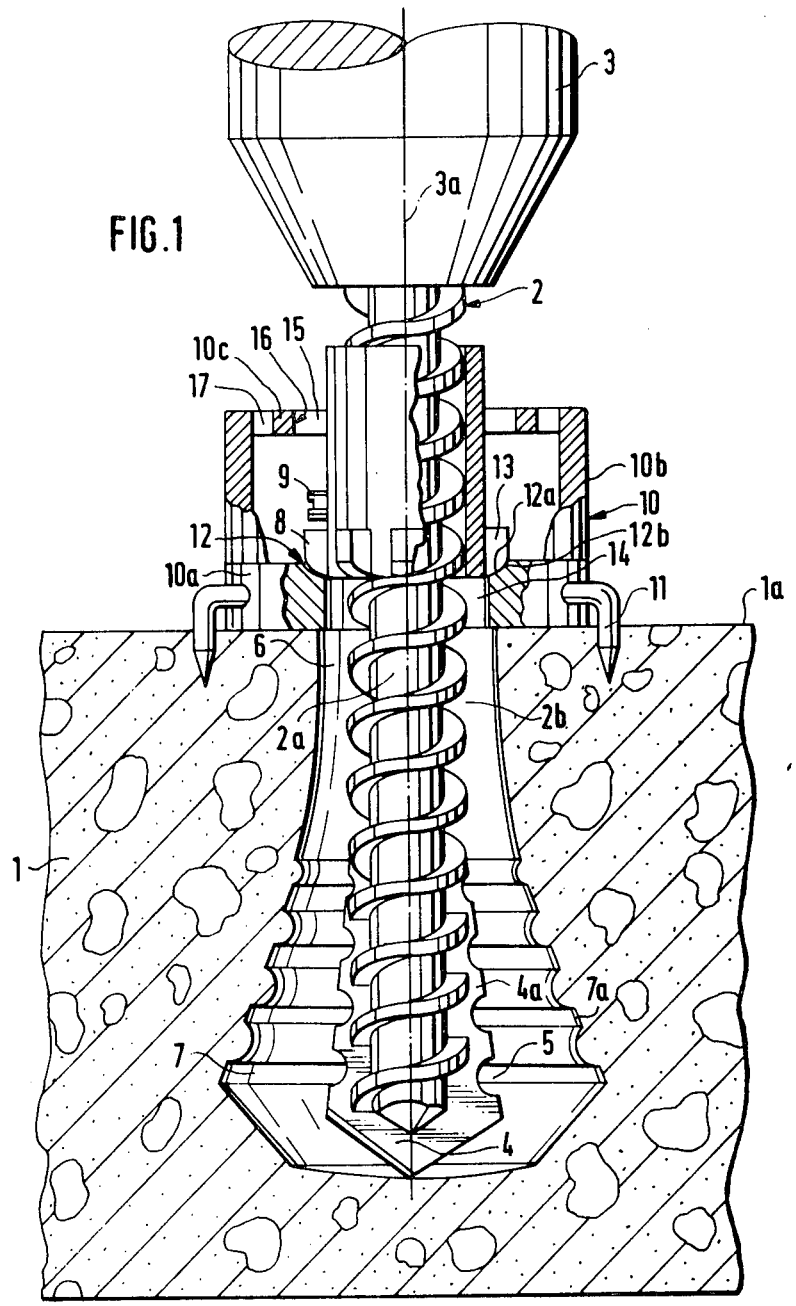
FIG. 1 is a partly sectioned side elevational view of a tool assembled with a collar member and an abutment member of the kit of the present invention and with a power tool.

Referring now to the drawings, and first to FIG. 1 therof, it may be seen therein that the reference numeral 1 indicates a structure to which an object is to be anchored. The structure 1 is to be provided with a hole by means of some components of the kit of the present invention, such as a tool or drill 2 which is driven in rotation by means of a power tool 3, the illustrated chuck of which rotates about an axis 3a. The tool 2 includes a shank 2a which is formed with deep helical recesses 2b which serve for removing severed particulate material from a hole 6 being drilled. A drill bit 4, here illustrated as a drill leaf of hard metal or sintered material, is connected to the leading end of the shank 2a and has lateral cutting edges 4a which are located at a greater diameter than the outer diameter of the shank 2a and which extend over a part of the length of the shank 2a. In order to enhance and assure the removal of the particulate material from the region of the leading end of the shank 2a, the cutting edges 4a are interrupted but cutouts 5 provided in the drill bit 4 and located in the region of the recess or recesses 2b.

In order to render possible pivoting and simultaneous orbiting of the shank 2a so as to form an undercut portion 7 in an originally cylindrical hole 6, a collar 8 is mounted on the shank 2a for displacement longitudinally thereof, and a setting screw 9 is used for securing the collar 8 in any desired position thereof relative to the shank 2a. The collar 8 is received, under certain circumstances which will be explained later on, in a depression 12 of an abutment member 10 which surrounds the tool element shank 2a and rests against the exposed surface of the support structure 1. In order to improve the sliding of the collar 8 in the depression 12, the collar 8 is provided, at its side facing toward the abutment member 10, with rounded portions 12a of convex configuration which are complementary to the configuration of a convex surface 12b of the depression 12 in the abutment member 10. For the purpose of facilitating the removal of the particulate material from the interior of the hole 6, the collar 8 is provided with openings 13 which extend parallel to the central axis of the collar 8 and thus to the axis of rotation of the shank 2a.

Pin-shaped projections 11 which are provided on the abutment member 10 serve to retain the abutment member 10 against joint rotation with the collar 8 and with the shank 2a. These pin-shaped projections 11 penetrate into the material of the support structure laterally of the open end of the hole 6 upon pressing of the collar 8 received in the depression 12, against the abutment member 10 in the axial direction of the shank 2a. In view of the fact that, at the beginning of the drilling operation, the collar 9 is out of contact with the abutment member 10, the latter may be equipped with a laterally extending handle which can be grasped by the operator of the arrangement so as to be able to retain the abutment member 10 against joint rotation with the shank 2a and with the collar 8 even during the initial stage of the operation of the arrangement.

As further illustrated in FIG. 1, the abutment member 10 may be formed with a cylindrical holding sleeve 10b which, during the drilling, coaxially surrounds the shank 2a, the axis of the holding sleeve 10b coinciding with the central axis of the abutment member 10 and particularly of an abutment plate 10a thereof. The latter has a central opening 14 which is in communication with the hole 6 being drilled and permits penetration of the particulate material from the hole 6 toward the openings 13 of the collar 8.

The holding sleeve 10b has at its end which is to face away from the exposed surface of the support structure 1, a radially inwardly extending flange 10c which has an opening 15 that coaxially surrounds the central axis of the hole 6. The opening 15 has a larger diameter than the shank 2a of the tool element 2 and is surrounded by a margin 16 which serves as an abutment for limiting the pivoting movement of shank 2a relative to the holding sleeve 10b during the undercutting operation. The flange 10c is provided, in the region of merger thereof with the holding sleeve 10b, with a plurality of openings 17 through which particulate material removed from the support structure 1 during the drilling or undercutting operation, which has entered the interior of the holding sleeve 10b, can escape to the exterior of the abutment member 10. The flange 10c may be flush with the free end of the holding sleeve 10b, or can be somewhat recessed relative thereto.

Figure 2:
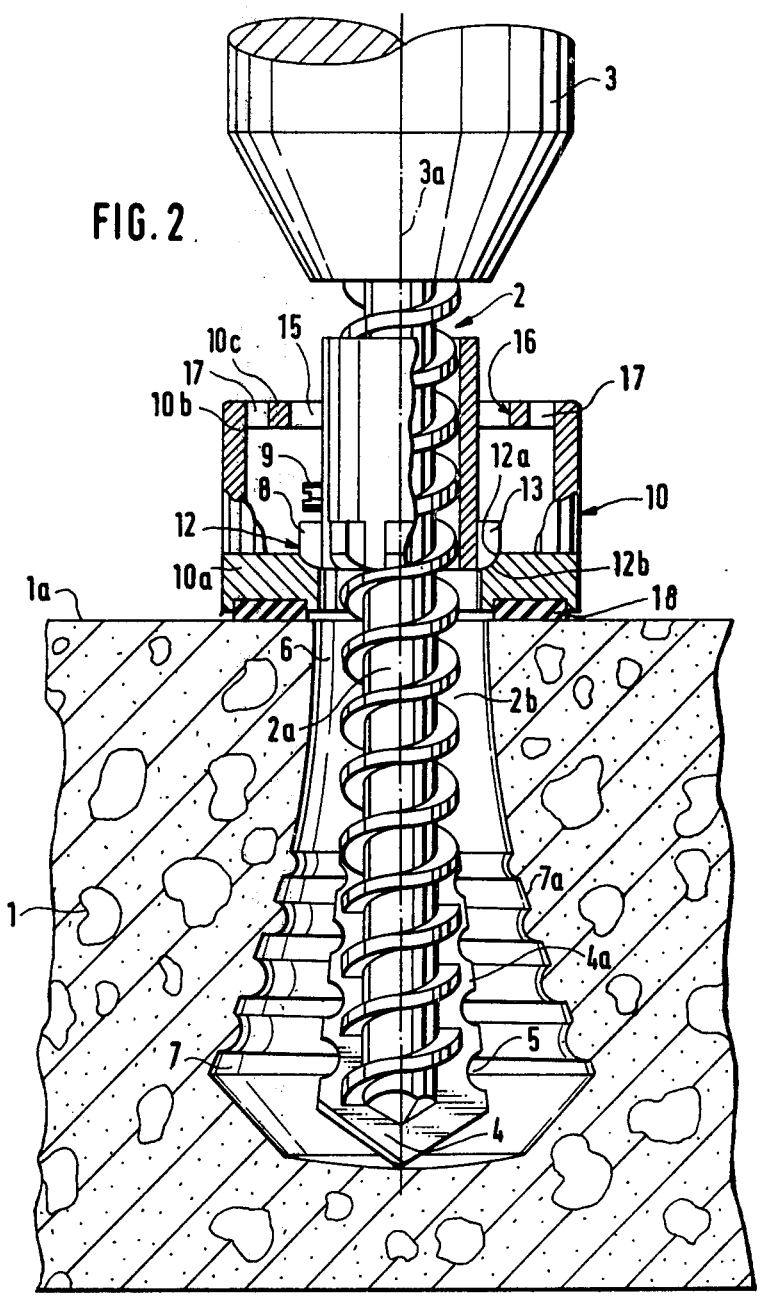
FIG. 2 is a view similar to FIG. 1 but illustrating a modified embodiment of the abutment member.

FIG. 2 is in many respects similar to FIG. 1, except that it illustrates an arrangement for increasing the frictional retainment of the abutment member 10 on an exposed surface 1a of the support structure 1 against joint rotation with the shank 2a and with the collar 8, which replaces the pins 11 of the embodiment of FIG. 1. As illustrated, a rubber annulus 23 is arranged at the abutment surface of the abutment member 10 or the abutment plate 10a thereof, so that the annulus 23 is concentric and coaxial with the abutment plate 10a. However, an annular suction cup, or a plurality of small suction cups distributed about the central axis of the abutment member 10, could be substituted for the illustrated rubber annulus 23.

Figure 3:
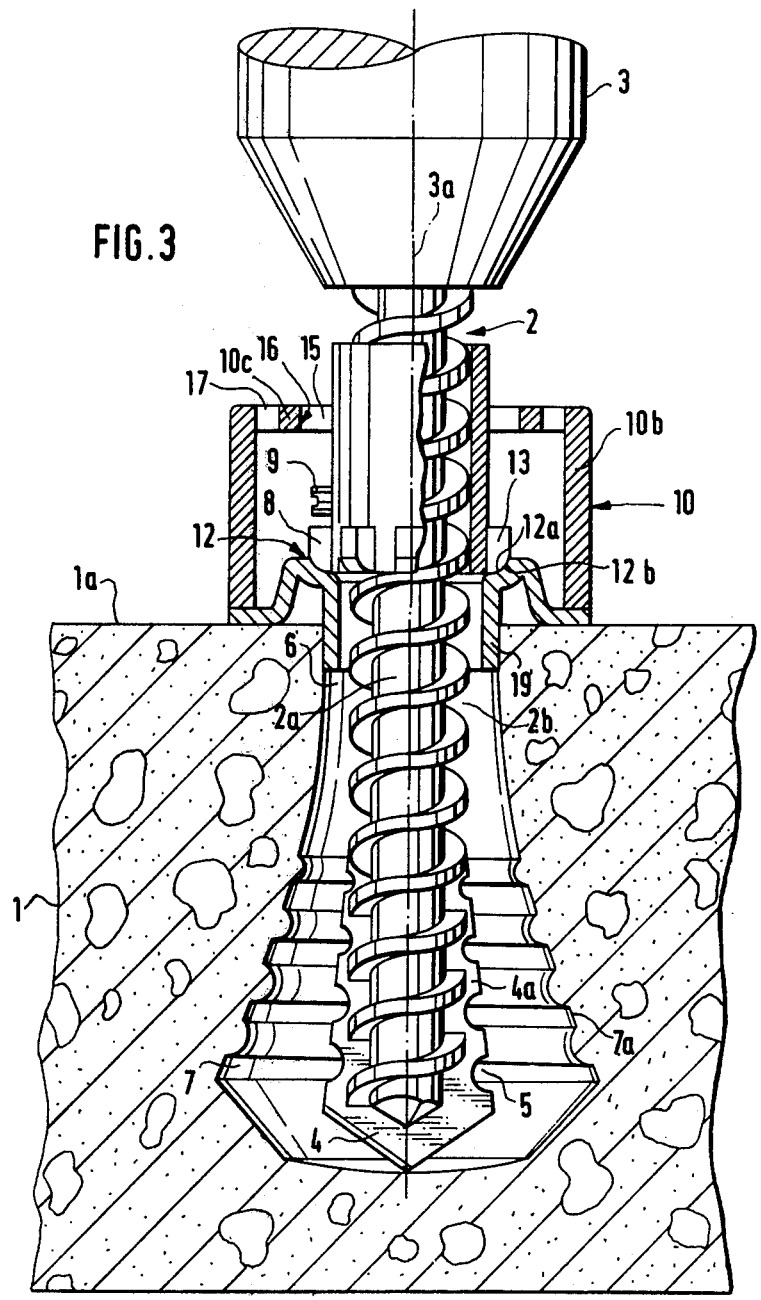
FIG. 3 is a view similar to FIG. 1 but including a further modification of the abutment member of the kit of the present invention.

For the purpose of centering the abutment member 10, and thus for faultless determination of the exact position of the depression 12 which cooperates with the collar 8, the abutment plate 10a, as illustrated in FIG. 3, can be provided with a centering projection 19 which axially projects beyond the abutment surface of the abutment plate 10a, the outer diameter of the centering projection 19 corresponding to the inner diameter of the hole 6 in the region of the open end thereof. Thus, the centering projection 19 can be accommodated in the confines of the open end of the hole 6, thus preventing the abutment member 10 from conducting movements parallel to the plane of the exposed surface 1a of the support structure 1.

The arrangement illustrated in FIGS. 1 to 3 can be used for undercutting already existing cylindrical holes 6 in support structures. However, both the cylindrical drilling and the undercutting operation can be performed by using the arrangement of FIGS. 1 to 3 in that the drill bit 4 is capable of first producing the cylindrical hole 6 while it is advanced axially of itself, and then the rocking or orbiting motion of the shank 2a will result in undercutting the region of the hole 6 which is remote from the open end thereof. As a concomitant of the provision of the cutouts 5, the undercut region 7 of the hole 6 will be formed with grooves 7a which improve the retention of an anchoring element in the hole 6, as will be presently explained.

In this connection, it is to be mentioned that at least the collar 8 with its set screw 9 and the abutment member 10, but preferably also the tool element 2, are constituents of the kit of the present invention.

Figure 4:
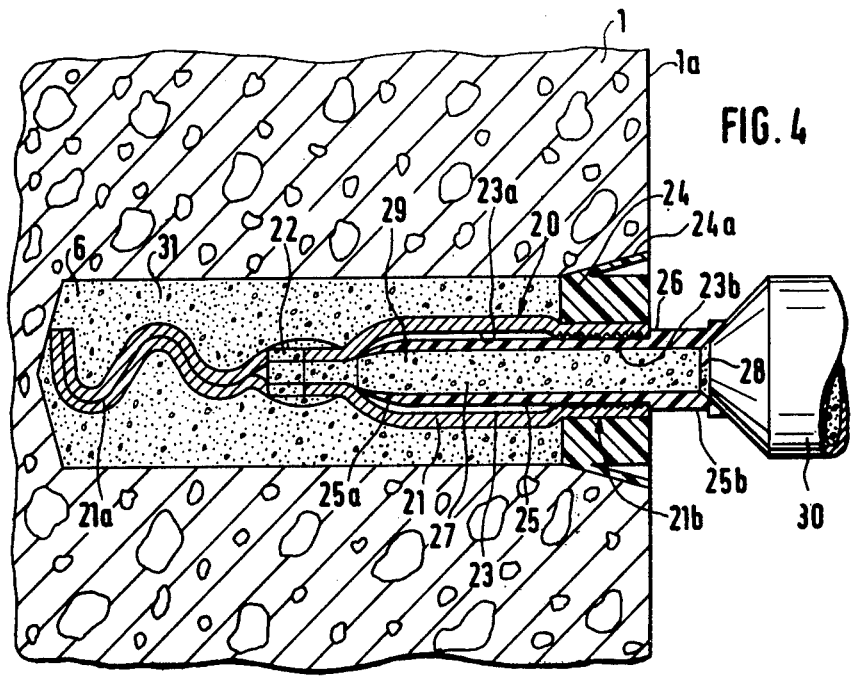
FIG. 4 is a partly sectioned side elevational view illustrating an anchoring element, a shielding sleeve and a part of an injection device of the kit of the present invention.

Turning now to FIG. 4, it may be seen that it illustrates a subsequent stage of the use, and additional components of, the kit of the present invention. One of such components is an anchoring element designated in toto with the reference numeral 20, which consists of an anchoring member 21 and of a cap member 24. The anchoring member 21 has a front end 21a which is squashed flat and bent into a curvilinear pattern to increase the anchorage effect. Furthermore, it has a trailing end region 21b on which the cap member 24 is supported. The cap member 24 has a sealing lip 24a which is located exteriorly of the sleeve-shaped portion of the cap 24 and which is resilient to reliably seal the hole 6 even when the mouth of the hole 6 is broken away.

When the anchoring member 21 is inserted into the anchoring hole 6, it is received therein with a clearance 31. The anchoring member 21 has an internal passage 23 bounded by an internal surface 23a which has a threaded portion 23b substantially in juxtaposition with the trailing end region 21b and internally thereof. The internal passage 23 communicates with the clearance 31 via an opening 22 or a plurality of such openings.

The clearance 31 about the anchoring element 21 is to be filled with a hardenable substance which is to harden about the anchoring member 21 and thus anchor the latter in the hole 6. Prior to such filling of the clearance 31, a plastic material shielding sleeve 25 is inserted into the interior passage 23 of the anchoring member 21 until a tapered leading end 25a of the sleeve element 25 abuts against the internal surface 23a to seal the internal passage 23.

A rear end 25b of the sleeve element 25 abuts against the trailing end face of the anchoring member 21 and absorbs excess pressure exerted on the sleeve element 25 by an injection device 30 which is pressed axially against the sleeve 25 during the injection of hardenable material into a duct 27 bounded by the sleeve 25 through a conical end portion 28 thereof. The hardenable material which flows through the duct 27 has been designated with the reference numeral 29.

The end portion 25b has a predetermined length which permits the gripping thereof by a tool, such as a pair of pliers, for pulling the sleeve element 25 out of the internal passage 23.

In operation, the injecting device 30 is pressed against the end portion 25b of the sleeve 25 so that a seal is made thereat, and the hardenable substance 29 is then injected through the duct 27 of the sleeve 25 and from there through the opening 22 in the anchoring member 21 into the clearance 31. After the hardenable substance 29 has set in the clearance 31 and also in the duct 27, the sleeve 25 is removed together with the hardened substance 29 present therein. Thus, the interior passage 23 of the anchoring member 21 is left clear, and the threaded portion 23b is free to receive an anchoring screw.

Figure 5:
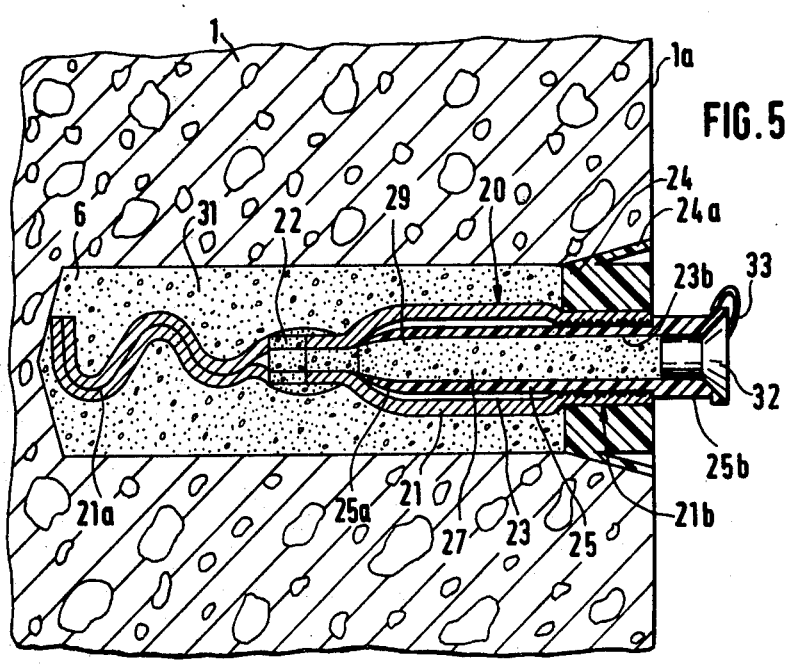
FIG. 5 is a view similar to FIG. 4 but illustrating the situation upon removal of the injection device.

The arrangement of FIG. 5 is substantially the same as that of FIG. 4, and like reference numerals identify like parts. The difference resides in the fact that, after the substance 29 has filled the clearance 31, the injection device 30 is removed and the trailing end 25b of the sleeve 25 is closed by a covering cap 32 connected to the sleeve 25 by an injection-molded thread 33. Especially in the case of support structure 1, the still fluid hardenable substance 29 cannot flow outwardly of the anchoring hole 6, when the cap 32 plugs the open end of the duct 27.

Here again, the injection device 30, and a plurality of the anchoring elements 20, together with a container for the hardenable substance 29, are constituent parts of the kit of the present invention.

Figure 6:
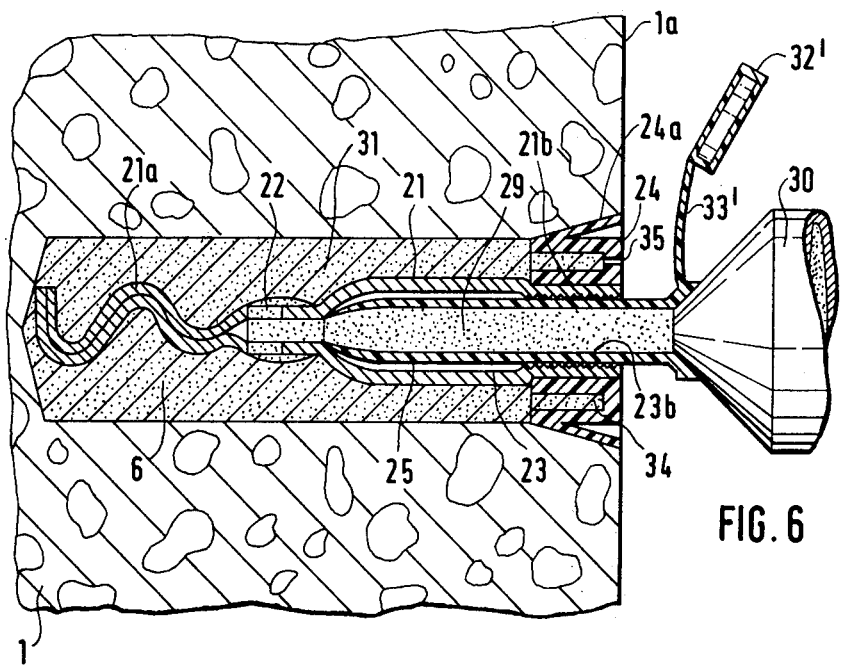
FIG. 6 is a view similar to FIG. 4 but illustrating a modification of the anchoring element and of the sleeve of the kit of the present invention.

Referring now in detail to FIG. 6, it may be seen that it in many respects resembles FIGS. 4 and 5 so that the parts of the assembly bearing the same reference numerals will not be discussed in detail. One difference between these embodiments resides in the configuration of the cap member, here designated with the reference numeral 32', as a hollow member which, instead of being inserted into the open end of the duct 27, as the plug 32 is, is slid externally over the end portion 25b of the shielding sleeve 25.

However, and more importantly, this figure illustrates that the cap member 24 is formed with a depression 34 which may be configured as an annular groove, the depression 34 extending from the inner surface of the cap member 24 to just short of the external surface of the latter. Because of the relatively small thickness of the material of the cap member 24 at the bottom of the depression 34, there is achieved at least a partial transparency or translucency of the cap member 24 in such region.

The reason for providing the depression 34 is that the opening 22 is arranged at the leading end of the tubular anchoring member 21, so that the clearance defined in the anchoring hole 6 by the anchoring member 21 will be filled substantially from the bottom of the anchoring hole 6 toward the ring-shaped cap member 24. As a result of the at least partial translucency or transparency of the ring-shaped cap member 24, the hardenable material, when it reaches the cap member 24, will become visible or perceivable through the transparent or translucent region of the ring-shaped cap member 24, as a result of the change in color of the latter.

In particular, the dimensions of the depression 34 can be so selected in accordance with a well-known principle, in dependence on the viscosity of the hardenable material 29, that certain pressure must prevail in the clearance before the hardenable material can penetrate into the depression 34. When this expedient is resorted to, it is thereby avoided that the hardenable material 29 could flow into the depression 34 prior to complete filling of the clearance, such as due to gravity, and thus give false indication of the non-existent completion of the filling of the clearance. This is particularly important for use of the anchoring element 20 in overhead anchoring holes 6, where the clearance starts filling with the hardenable material from the cap member 24.

The cap member 24 also has an orifice 35 through which air escapes from the clearance as it is displaced by the hardenable material 29 during the introduction of the latter into the clearance. When the hardenable material has a very low viscosity, the indication of the achievement of the predetermined pressure in the clearance can also be obtained by using this orifice 35, the cross-section of the venting orifice 35 being then so selected in dependence on the pressure which is to prevail in the clearance upon determination of the injection of the hardenable material 29 thereinto, that the hardenable material 29 will pass through the venting orifice 35, but only after the pressure in the clearance around the anchoring member 21 has reached a predetermined level. Thus, the appearance of the low-viscosity hardenable material 29 at the external end of the venting orifice 35 will give an indication of the completion of the filling of the clearance defined in the anchoring hole 6 by the anchoring member 21 with the hardenable substance 29.

Instead of providing the depression 34 and/or the venting orifice 35, the cap member 24 may be partially or entirely made of a transparent or translucent material, which will give satisfactory information as to the degree of filling of the hole 6 with the hardenable substance 29 in most applications, except in overhead holes 6.

Figure 7:
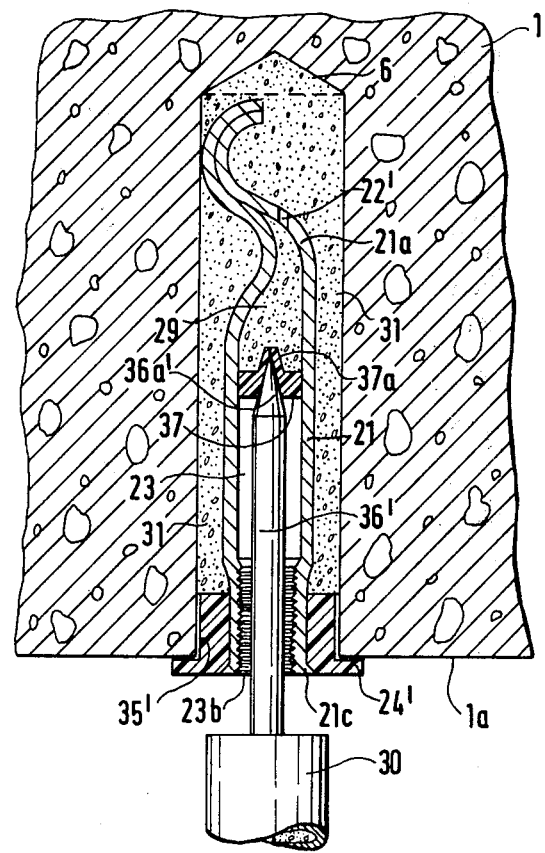
FIG. 7 is a view similar to FIG. 4 but illustrating a further modification of the anchoring element and of the injection device equipped with the shielding sleeve, of the kit of the present invention.

Turning attention now to the modification illustrated in FIG. 7, where the same numerals have been used again to designate similar parts, it may be seen that the flow-through opening 22' is provided at a different part of the anchoring member 21, namely on the leading end portion 21a thereof. The passage 22' communicates with the clearance about the anchoring member 21 and also with the interior passage 23 of the anchoring member 21. Thus, when the injection device 30 is inserted into the passage 23, the substance or hardenable material 29 is injected through the flow-through opening 22' into the clearance so as to fix the anchoring member 21 in the hole 6. In this modification, the injection device 30 has a nozzle 36' having a conical leading end portion 36a'.

To keep the trailing end of the anchoring member 21 free of hardenable substance 29, a stoppage valve 37 having resilient valve flaps 37a bounding a conical center hole is provided in the passage 23 downstream of the trailing end of the anchoring member 21. The nozzle 36' of the injection device 30, and particularly the conical leading end 36a' thereof, is received in the center hole between the flaps 37a, and the substance 29 is injected therethrough under pressure causing the flaps 37a to part. After the leading end 21a of the anchoring member 21 is filled with the substance or material 29, the clearance about the anchoring member 21 is also filled. The valve flaps 37a, which taper to a point, close when the nozzle 36' of the injection device 30 is withdrawn and prevent the substance 29 from flowing back and depositing on the threaded portion 23b and thereafter obstructing the entrance of an anchoring screw therein.

The cap member 24' of this modification is equipped with ventilating passages 35' which permit escape of air displaced by the hardenable substance 29 during the filling of the clearance with such hardenable substance 29.

Figure 8:
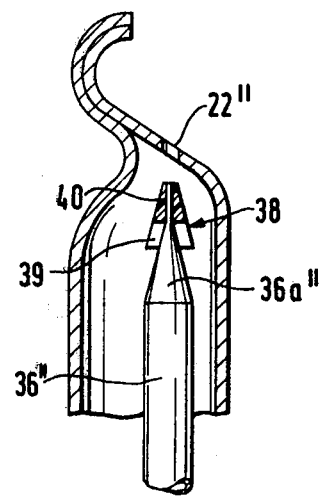
FIG. 8 is a fractional view similar to FIG. 4 but illustrating a further modification of the anchoring element and of the injection device of the kit of the present invention.

Instead of mounting the stoppage valve 37 upstream of the flow-through passage or opening 22', FIG. 8 shows another possibility when a cone-shaped valve 38, which is placed on the nozzle 36a'' of the device 30, is inserted in the flow-through opening 22'' after the injection process has been terminated. The central hole 40 of the valve 38 is bounded by flaps made resilient by the presence of slits 39 so that the valve 38 closes the flow-through opening 22'' upon the removal of the nozzle 36a''.

Figure 9:
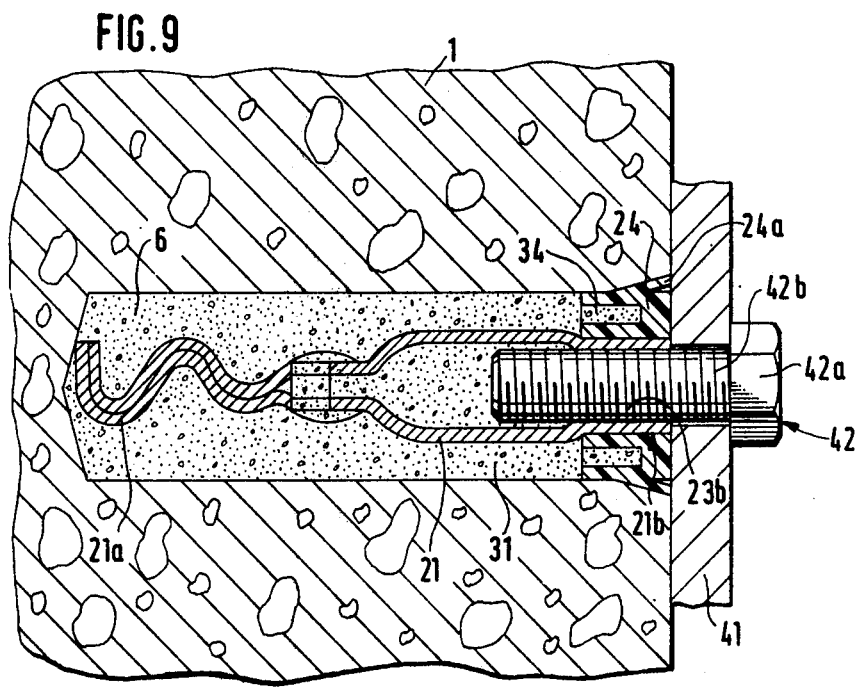
FIG. 9 is a view similar to FIG. 4 but illustrating the situation upon securing of an object to the anchored anchoring element.

FIG. 9 illustrates how an object 41 is anchored to the support structure 1 by means of the anchoring member 21, cap member 24, the hardenable material 29 which has hardened in the clearance 31 and in the depression 34, and a screw 42. The screw 42 has a head 42a, a threaded shank 42b, and is threaded into the internal thread 23b of the trailing end region 21b of the anchoring member 21.

Figure 10:
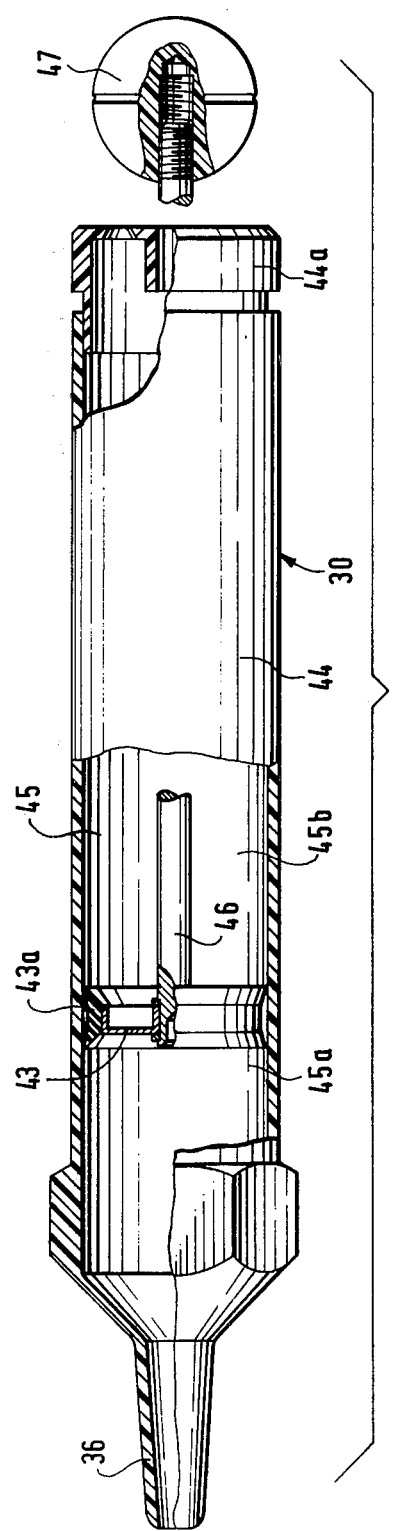
FIG. 10 is a partially sectioned side elevational view of the injection device forming a part of the kit of the present invention.

The injection device 30 which is a constituent part of the kit of the present invention is illustrated in more detal in FIG. 10. It includes a cylinder or housing 44 having at its front end the nozzle 36, while being closed at its rear end by a closure 44a. The cylinder 44 and the closure 44a together bound a chamber 45 in which there is accommodated a piston 43 having a sealing ring 43a thereon and subdividing the chamber 45 into two compartments 45a and 45b. A piston rod 46 is connected to the piston 43 and extends through the closure 44a to the exterior of the device 30, a knob 47 being mounted on the free end of the piston rod 46. Prior to the use of the injecting device 30, the compartment 45a is filled with the hardenable substance which is then expelled through the nozzle 36 by the piston 43 as the latter is displaced in the frontward direction, that is, toward the nozzle 36.

Figure 11:
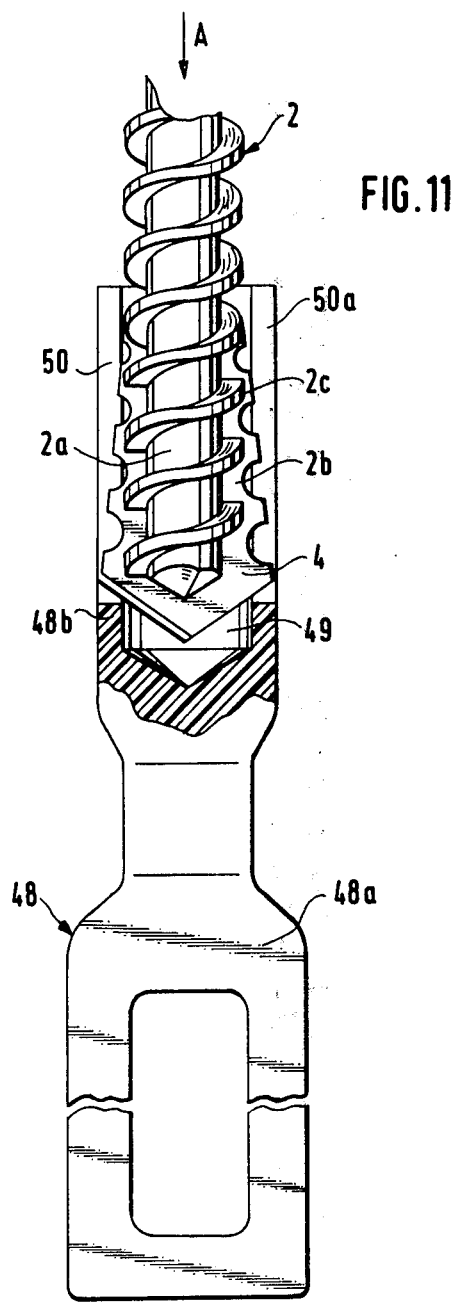
FIG. 11 is a partly sectioned side elevational view of an assembly of a stirrer with the tool of the kit of the present invention.
Figure 12:
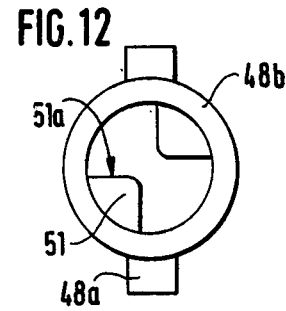
FIG. 12 is an end view of the stirrer taken in the direction of the arrow A of FIG. 11.

Finally, FIGS. 11 and 12 illustrate a stirrer 48, also a component part of the kit of the present invention, as assembled with the tool element 2 of the kit. The stirrer 48 has a receiving passage 49 for receiving the shank 2a and the drill bit 4 of the tool element 2. The shank 2a is clamped, in the same manner as illustrated in FIG. 1, in the chuck of the power tool 3, and is rotated by the latter during the use of the stirrer 48 for mixing the hardenable substance accommodated in a non-illustrated container. The torque exerted by the power tool 3 on the tool element 2 is transmitted to the stirrer 48, as seen in FIG. 11, by means of two diametrically opposite slots 50 communicating with the receiving passage 49 of the stirrer 48 and each having an engaging portion 50a. The portions of the drill leaf 4 which extend radially beyond the shank 2a of the tool element 2 are received in the slots 50 and engaged by the engaging portions 50a. The diameter of the receiving passage 49 substantially corresponds to that of the shank 2a so that a good abutment and clamping of the stirrer 49 on the tool element 2 is achieved. In order to achieve the clamping action, it is recommended to make the stirrer 48 of a resilient synthetic plastic material. Additional means may also be provided for connecting the stirrer 48 to the tool element 2, such as a non-illustrated yieldable tongue which, in the assembled position, is received between the turns of the helical projection 2c bounding the helical recess 2d of the tool element 2.

On the other hand, FIG. 12 illustrates a special configuration of the bottom region 48b surrounding the bottom of the receiving passage 49, which also provides for the transmission of torque from the tool element 2 to the stirrer 48. In this modified embodiment, projections 51 are provided at the bottom of the receiving passage 49, each of which has an entraining region 51a. When the stirrer 48 is slid over the drill bit 4 and the free end of the tool element 2, the entraining regions 51a are in contact with the drill leaf 4 and, consequently, the latter entrains the entraining projections 51 and thus the stirrer 48 for joint rotation therewith. A particular advantage of this arrangement is that the sliding over and entrainment of the stirrer 48 can be accomplished during the rotation of the tool element 2. The stirrer 48 has a stirring portion 48a which is then introduced into the body of the material to be mixed accommodated in the above-mentioned container and mixes such material.

The kit of the present invention which encompasses the above-enumerated and described components represents a simple, reliable and otherwise advantageous means for securing objects to support structures, the kit comprising all of the components which are necessary or needed for the accomplishment of such anchoring. Of course, this kit can be considered as a starter kit those components of which that are either used or worn out can be purchased separately in order to restore the completeness of the kit. When on sale, the kit may be accommodated in a special package or box providing a separate space or compartment for reach of the components of the kit. Such box has not been illustrated inasmuch as the provision thereof only represents an expedient of the packaging technique.

It will be understood that each of the elements described above, or two or more together, may also find a useful application in other types of assemblies differing from the types described above.

While the invention has been illustrated and described as embodied in a kit for anchoring objects to support structures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A kit for use with a drive in establishing arrangements for securing objects to support structures, comprising a drilling tool for drilling anchoring holes in support structures, having a free end provided with cutting edges and another end adapted to be engaged by the drive for rotating said tool about an axis; means for supporting said tool at an exposed surface of a respective support structure, including a collar member adapted to be mounted on said tool intermediate said ends thereof for joint rotation therewith, and an abutment member adapted to surround said tool and contact said exposed surface, said members having respective concave and convex contact surfaces which, upon slidingly contacting one another, constitute a bearing for movement of said tool between a plurality of positions in which said axis encloses different angles with said exposed surface to thereby increase transverse dimensions of a respective hole in direction away from an open end thereof that opens onto said exposed surface; a plurality of anchoring elements each having a leading end portion of transverse dimensions smaller than, and a trailing end portion of transverse dimensions substantially corresponding to, those of said open end so that said trailing end portion supports said element in said open end with a clearance around said leading end portion and closes said open end upon insertion of said element into said hole; and means for introducing hardenable material into said clearance to form a hardened body around said leading end portion of said element to anchor the latter in said hole upon hardening of said material, including an internal passage bounded by an internal surface and extending through said element between said end portions of the same, at least one opening communicating said passage with said clearance at said leading end portion of said element, and shielding means for guiding said material through said passage toward said opening and for separating such material from a region of said internal surface which is located upstream of said opening.

2. A kit as defined in claim 1, wherein said drilling tool includes a plate-shaped drill bit at said free end; and wherein said cutting edges are provided on said bit.

3. A kit as defined in claim 2, wherein said drilling tool has at least one helical recess between said ends thereof, which is operative for forwarding particulate material removed from said structure during the operation of said tool towards and out of said open end of said hole.

4. A kit as defined in claim 3, wherein said bit has cutouts at said cutting edges at the elevations of the turns of said helical recess.

5. A kit as defined in claim 1, wherein said collar member has a plurality of grooves extending substantially parallel to said axis when said collar member is mounted on said tool.

6. A kit as defined in claim 1, wherein said support means includes means for retaining said abutment member against rotation with said collar member.

7. A kit as defined in claim 6, wherein said retaining means includes at least one pin-shaped projection on said abutment member which penetrates into said structure upon contact of said abutment member with said exposed surface.

8. A kit as defined in claim 6, wherein said retaining means includes a layer of friction-enhancing material at a surface of said abutment member which faces said exposed surface.

9. A kit as defined in claim 1, wherein said abutment member includes a housing having an abutment plate provided with one of said contact surfaces, a flange, and a holding sleeve connecting said flange to said abutment plate at a distance therefrom; and wherein said collar member is at least partly accommodated within the confines of said housing.

10. A kit as defined in claim 9, wherein said housing has at least one escape opening for particulate material accumulating within said confines.

11. A kit as defined in claim 1, wherein said anchoring element includes an anchoring member having said leading end portion and a trailing end region, and a cap member mounted on said trailing end region and constituting said trailing end portion of said element.

12. A kit as defined in claim 11, wherein said cap member is at least partly translucent for observing the progress of filling of said clearance with said material.

13. A kit as defined in claim 12, wherein said cap member has an annular groove in a side thereof which faces toward said leading end portion of said element, which has such dimensions that said material penetrates into said groove only after a predetermined pressure has been reached in said clearance; and wherein said annular groove has a bottom wall at the other side of the cap member which constitutes a partly translucent portion of said cap member.

14. A kit as defined in claim 12, wherein said cap member has at least one vent opening which communicates with clearance with the exterior of said structure, said vent opening having such dimensions as to permit escape of air displaced by the material from said clearance and to prevent such escape of said material.

15. A kit as defined in claim 11, wherein said anchoring member has at least one corrugation at said leading end portion thereof to improve retention of said element in said hardened body.

16. A kit as defined in claim 1, wherein said shielding means includes a shielding sleeve having an end zone which contacts said internal surface of said element intermediate said upstream region and said opening upon introduction of said shielding sleeve into said internal passage.

17. A kit as defined in claim 16, wherein said sleeve has a duct for conveying said material toward said opening, said duct having a mouth through which said material is introduced into said duct; and further comprising a closure for said mouth which prevents backflow of said material through said duct subsequent to the introduction of such material into said clearance and prior to hardening thereof.

18. A kit as defined in claim 17, wherein said shielding sleeve is accommodated in said internal passage at least between the commencement of the introduction of said material into said clearance and the hardening of said material in said clearance and in said duct; and wherein said shielding sleeve is subsequently removable from said internal passage, together with the material which has hardened in said duct, to free said internal passage for receiving a threaded member therein.

19. A kit as defined in claim 1, wherein said introducing means further includes an injection device having a nozzle adapted to communicate with said opening through said internal passage.

20. A kit as defined in claim 19, wherein said injection device further includes a cylinder bounding a chamber, a piston mounted in said chamber for reciprocation and subdividing said chamber into two compartments one of which communicates with said nozzle, and a piston rod extending through the other compartment to the exterior of said cylinder and having an actuating portion thereat.

21. A kit as defined in claim 19, wherein said shielding means includes a shielding sleeve having one end zone which contacts said internal surface of said element intermediate said upstream region and said opening upon introduction of said sleeve into said internal passage of said element and other end zone, and bounding a duct for conveying said material toward said opening and having a mouth at said other end zone; and wherein said nozzle is adapted to be sealingly received in said mouth during the operation of said injection device.

22. A kit as defined in claim 19, and further comprising a container for a replenishable supply of said material; and further comprising a stirrer for mixing said supply in said container.

23. A kit as defined in claim 22, wherein said stirrer is elongated and has a stirring end portion and an entraining end portion; and wherein said entraining end portion is hollow and adapted to receive said free end of said tool for entrainment of said stirrer for joint rotation with said tool.

24. A kit as defined in claim 23, wherein said entraining end portion has entraining regions adapted to abut said tool in the circumferential direction thereof.

25. A kit as defined in claim 24, wherein said tool has a plate-shaped drill bit having said cutting edges; and wherein said entraining regions bound at least one longitudinally extending slot in said entraining portion which is adapted to partly receive said drill bit.

26. A kit as defined in claim 24, wherein said tool has a drill bit which has at least one substantially radial recess at a free end face thereof; and wherein said entraining portion bounds a receiving passage dimensioned to receive said drill bit and having a bottom which has at least one projection constituting said entraining region and which contacts said radial recess of said drill bit upon introduction thereof into said receiving passage.

* * * * *